(12) United States Patent
Gustavsson (10) Patent No.: US 7,845,592 B2
(45) Date of Patent: Dec. 7, 2010

(54) REEL-UP AND ALSO A METHOD AND MEASURING UNIT IN SUCH A REEL-UP

(75) Inventor: Tord Gustavsson, Forshaga (SE)

(73) Assignee: Metso Paper, Inc., Helsinki (FI)

( * ) Notice: Subject to any disclaimer, the term of this patent is extended or adjusted under 35 U.S.C. 154(b) by 293 days.

(21) Appl. No.: 11/576,914

(22) PCT Filed: Oct. 7, 2005

(86) PCT No.: PCT/SE2005/001484

§ 371 (c)(1),
(2), (4) Date: Apr. 9, 2007

(87) PCT Pub. No.: WO2006/041385

PCT Pub. Date: Apr. 20, 2006

(65) Prior Publication Data

US 2009/0189008 A1  Jul. 30, 2009

(30) Foreign Application Priority Data

Oct. 11, 2004  (SE) .................................. 0402445

(51) Int. Cl.
*B65H 18/26* (2006.01)
(52) U.S. Cl. .............. 242/541.3; 242/541.4; 242/541.5; 242/541.6; 242/541.7
(58) Field of Classification Search .... 242/541.3–541.7
See application file for complete search history.

(56) References Cited

U.S. PATENT DOCUMENTS

| 4,746,076 | A | * | 5/1988 | Tomma et al. ............ 242/541.3 |
| 5,150,850 | A |   | 9/1992 | Adams |
| 5,673,870 | A |   | 10/1997 | Fielding et al. |
| 5,901,918 | A | * | 5/1999 | Klerelid et al. ............. 242/534 |
| 6,250,580 | B1 |  | 6/2001 | Madrzak et al. |
| 6,698,681 | B1 | * | 3/2004 | Guy et al. .................... 242/534 |
| 2007/0023561 | A1 | * | 2/2007 | Kemppainen et al. .... 242/532.3 |
| 2008/0006730 | A1 | * | 1/2008 | Lannes et al. ............ 242/334.6 |

FOREIGN PATENT DOCUMENTS

| EP | 0 658 504 | 6/1995 |
| EP | 0 860 391 | 8/1998 |
| WO | WO-03/004389 | 1/2003 |
| WO | WO 2004/110909 | 12/2004 |
| WO | WO 2005/077796 | 8/2005 |

OTHER PUBLICATIONS

Search Report and Written Opinion dated Nov. 28, 2005 for PCT/SE2005/001484.

* cited by examiner

*Primary Examiner*—Sang Kim
(74) *Attorney, Agent, or Firm*—Alston & Bird LLP (57) ABSTRACT

A reel-up for reeling a fiber web where the fiber web to be reeled and a supporting body form a reel nip. The reel-up has at least one measuring body which is arranged in order to be influenced by a turning torque which is a function of the linear load in the reel nip.

17 Claims, 6 Drawing Sheets

REEL-UP AND ALSO A METHOD AND MEASURING UNIT IN SUCH A REEL-UP

BACKGROUND OF THE INVENTION

1. Field of the Invention

The present invention relates to a reel-up for reeling a fiber web where the fiber web to be reeled and a supporting body form a reel nip.

Further, the present invention relates to a method for reeling a fiber web in a reel-up, the method comprising the step of forming a reel nip between the fiber web to be reeled and a supporting body.

The present invention also relates to a measuring unit, which is arranged for detecting load signals being a function of a linear load of a reel nip (15) of a reel-up.

2. Description of Related Art

When manufacturing paper in a paper machine, papermaking stock is formed into a web, which is dewatered, dried and then wound onto reel spools in order to form paper reels. As a rule, each finished paper reel, normally called a parent roll, is stored for a short period of time in order to subsequently be rewound and converted into more refined products.

In general terms, it is of vital importance that the winding is performed such that each parent roll is clear of defects which can disturb the converting. Ideally, the parent roll should have a circular cylindrical shape, i.e. exhibit a circular cylindrical envelope surface and two end surfaces which are flat and orthogonal to the envelope surface. Furthermore, the parent roll should be dimensionally stable, i.e. adjacent winding layers should not slide against each other so that the paper reel is deformed. In order to achieve this, the web should be wound in a controlled way and with a predetermined web tension in the longitudinal direction of the web throughout the entire paper reel. The web tension should be sufficiently high in order to produce the required friction between adjacent winding layers and to thereby prevent these from sliding against each other. At the same time, the web tension should not be so high that it destroys the paper properties produced in the paper machine. This is especially a problem when manufacturing soft and bulky tissue paper.

Normally, the winding is performed such that the paper reel being wound onto the reel spool abuts against some kind of supporting body during at least a part of the winding sequence. Thereby, the supporting body has the double task of driving the paper reel, as well as defining a reel nip together with the paper reel through which the web passes before it is wound up. It is general knowledge within the technical field that the linear load in the reel nip is an important parameter for controlling the web tension in the paper reel. When manufacturing tissue paper, however, it is desirable to have a linear load which is as low as possible in order to preserve the properties of the tissue paper. When manufacturing such paper grades, it therefore happens that the reel spool is equipped with a centre drive, wherein the linear load in the reel nip can be reduced and the web tension instead is controlled, entirely or partially, by means of modulating the rotational speed of the reel spool in relation to the web speed.

When manufacturing very soft and bulky tissue paper, however, it has proved to be difficult to dispense entirely with the web tension control function being provided by the reel nip. This is true particularly for so called through air dried tissue paper, and at the higher and higher winding speeds and larger parent roll diameters sought for in modern reel-ups. Instead, the design of the supporting body and the method of measuring and controlling the linear load in the reel nip have been developed further. Thereby, the development has gone from hard to soft reel nips, and towards more and more sophisticated methods of measuring and controlling the linear load in the reel nip.

The published documents WO 2004/110909, WO 2005/077796 and EP 0658504 all describe reel-ups in which the supporting body is made up of an endless belt. The belt can for example be a felt or a wire. During the reel-up the tension of the belt is regulated, which in turn influences the linear load in the reel nip.

EP 0860391 describes a reel-up in which the supporting body is made up of a plurality of endless belts being arranged one beside the other in the cross direction of the fiber web, and being individually adjustable in order to enable profile regulation of the linear load in the reel nip.

U.S. Pat. No. 5,901,918 discloses an apparatus for winding a paper reel. The winding apparatus is especially adapted for winding bulky tissue paper and comprises a supporting body in the form of an endless belt, which extends unsupported between two guide rolls. During the winding, the paper reel abuts against the belt at a point along the unsupported distance, wherein the paper reel deflects the belt and forms a soft reel nip with the belt. Accordingly, the deflection is a measure of the linear load in the reel nip. Furthermore, the winding apparatus includes a deflection sensor, which is arranged inside the belt loop for measuring the deflection of the belt, preferably by means of an optical system, ultrasonic system or another contactless system. In spite of the fact that the device according to U.S. Pat. No. 5,901,918 generally is working well, it can be mentioned in this dontext that contactless measurement, as a rule, exhibits the disadvantage that for example dust, water vapour, or the like, easily disturbs the measurement. The present invention tries to solve this problem.

BRIEF SUMMARY OF THE INVENTION

The reel-up according to the invention is characterized in that it comprises at least one measuring body which is arranged in order to be influenced by a turning torque which is a function of the linear load in the reel nip.

The method according to the invention is characterized in that the linear load of the reel nip is partly or fully measured by at least one measuring body which is arranged in order to be influenced by a turning torque which is a function of the linear load.

The measuring unit according to the invention is characterized in that it comprises a measuring body being arranged in order to be influenced by a turning torque which is a function of the linear load.

BRIEF DESCRIPTION OF THE SEVERAL VIEWS OF THE DRAWINGS

In the following, the invention will be described in greater detail with reference to the attached figures.

DETAILED DESCRIPTION OF THE INVENTION

Figure 1:
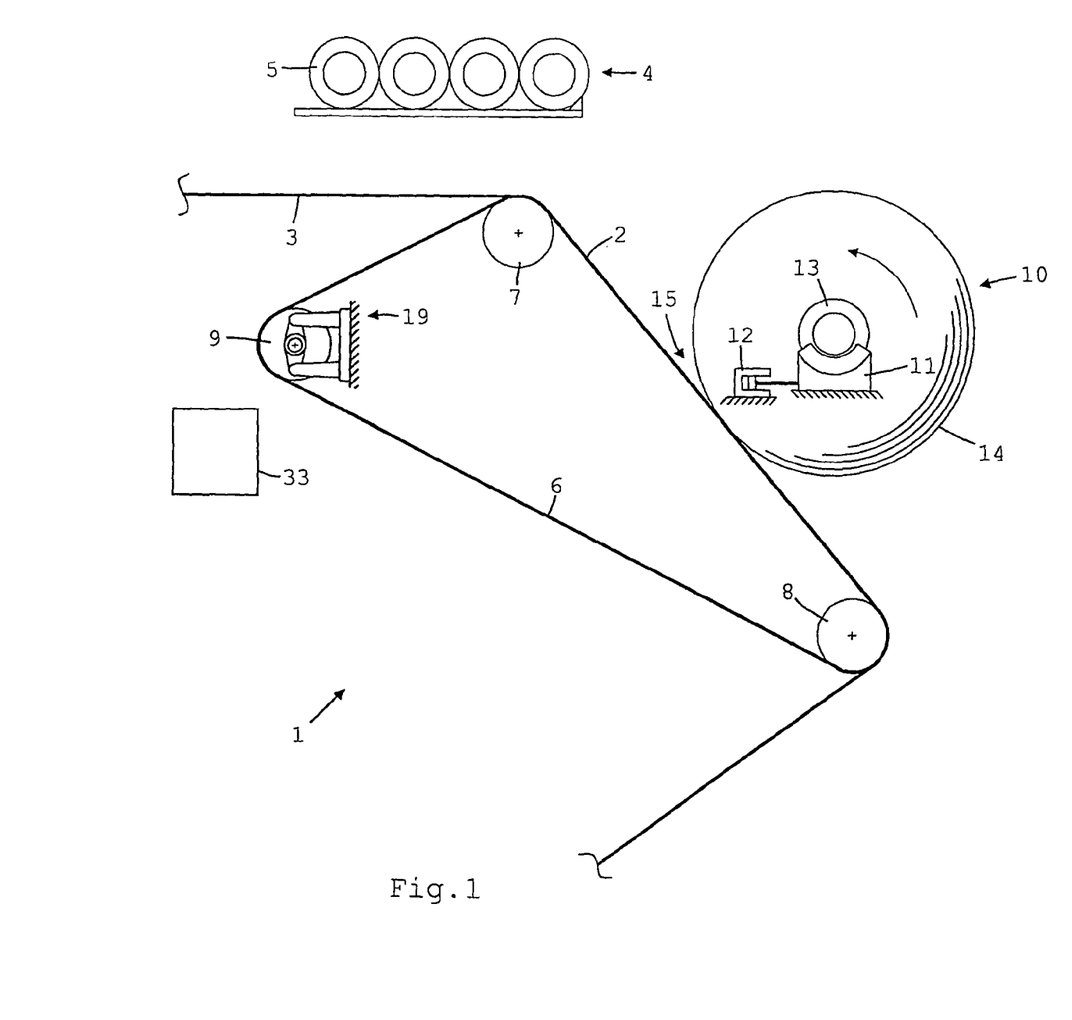
FIGS. 1 and 2 are schematic representations of a first embodiment of a reel-up according to the invention.
Figure 2:
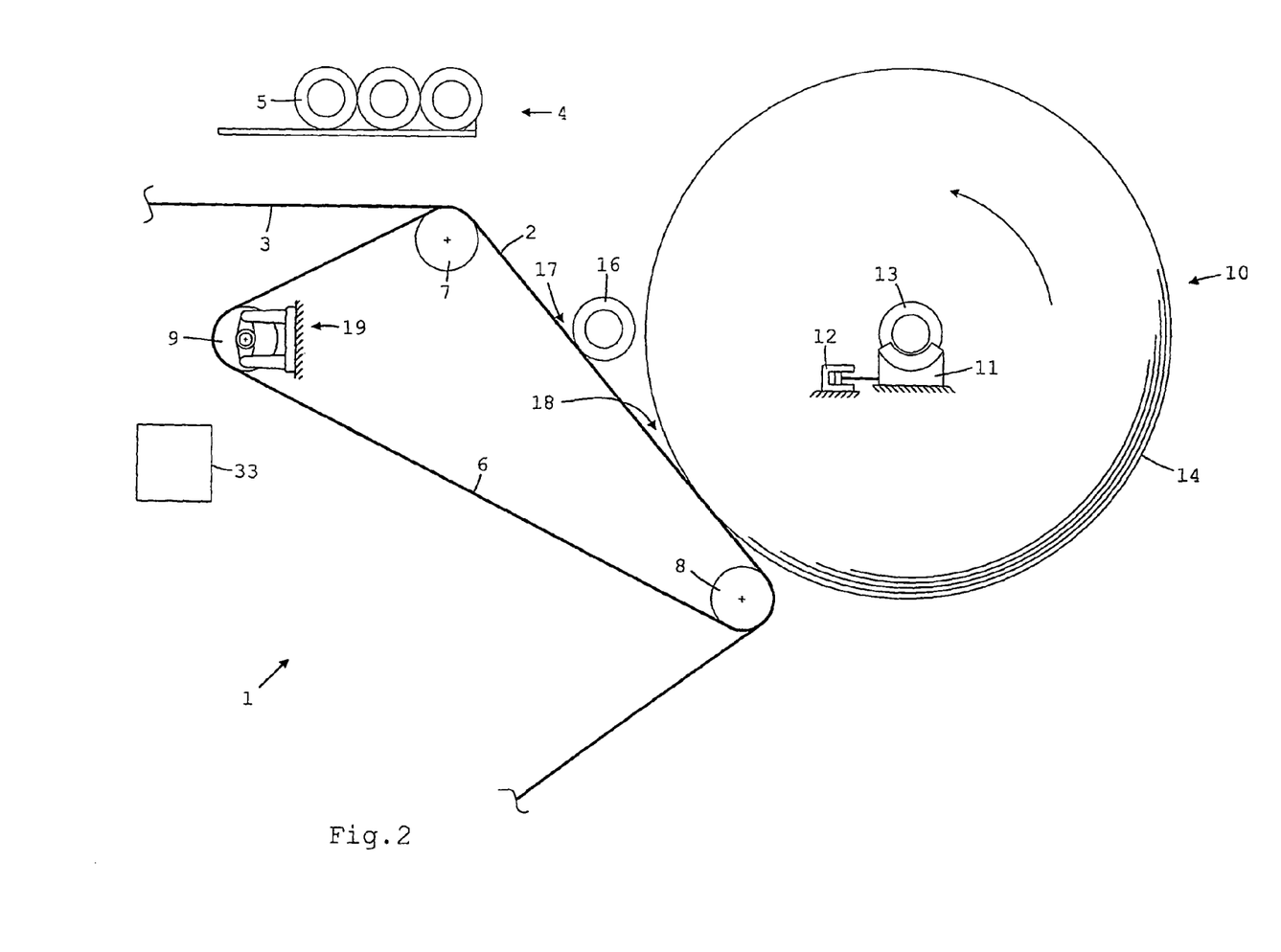

FIGS. 1 and 2 show a reel-up 1 of a paper machine. The reel-up 1 is arranged for receiving and winding a fiber web which in this case is a paper web 2, arriving from a drying section (not shown) of the paper machine while being supported by an endless wire 3. The reel-up 1 includes a storage 4 of reel spools 5, onto which said winding is intended to take place. Furthermore, the reel-up 1 includes a supporting body in the form of an endless belt 6, travelling inside the wire 3 loop around an upper guide roll 7, a lower guide roll 8 and an inner guide roll 9. Between the guide rolls 7 and 8, the belt 6 travels unsupported and makes an angle of approximately 45° with the horizontal plane along this unsupported distance. Also the wire 3 travels over the guide rolls 7 and 8, and accordingly, the paths of the wire 3 and the belt 6 coincide between the guide rolls 7 and 8 in such a way that the wire 3 is arranged to travel together with, and outside, or on top of, the belt 6.

The reel-up 1 also includes a winding unit 10. The winding unit 10 includes a support unit 11 in the form of a carriage being movable in the horizontal plane, as well as an actuator 12 for moving the carriage 11 in this plane. The carriage 11 is arranged for rotatably supporting a reel spool 13 during a winding sequence, so that a paper reel 14 can be formed onto the reel spool 13. The paper reel 14 is arranged for interacting with the belt 6, and the wire 3 travelling together with the belt 6, during at least a part of the winding sequence in order to form a reel nip 15 for the web 2 between the guide rolls 7 and 8. As the wire 3 and the underlying belt 6 are unsupported between the guide rolls 7 and 8, the paper reel 14 will form a soft nip with the supporting body, i.e. the belt 6, when the paper reel 14 abuts against the wire 3. In other words, the paper reel 14 will cause a deflection of the belt 6 and the wire 3, wherein the wire 3 is brought to enclose a portion of the envelope surface of the paper reel 14. The linear load in the reel nip 15 is controlled by means of the paper reel 14 being brought into a larger or smaller interaction with the supporting body by means of the actuator 12, wherein the deflection is brought to increase or to decrease. It is appreciated that the deflection influences the tensile stress in the belt 6. If the paper reel 14 is brought into larger interaction with the supporting body, the tensile stress increases, and if the paper reel 14 is brought into smaller interaction with the supporting body, the tensile stress decreases. In other words, the tensile stress in the belt 6 is a function of the linear load in the reel nip 15. The actuator 12 also has the task of ensuring that the desired linear load is maintained when the diameter of the paper reel 14 increases during the winding. This is accomplished by means of the actuator 12, more or less continuously, bringing the carriage 11 to leave the supporting body as the diameter of the paper reel 14 increases.

Alternatively, in a known fashion the support unit can include two parallel reeling rails which rotatably support the reel spool, the carriage not being arranged to support the reel spool but to control the movement of the reel spool in horizontal plane.

A winding sequence is performed such that a transfer device (not shown) fetches an empty reel spool 16 (see FIG. 2) from the reel spool 5 storage 4 when the preceding reel spool 13 is getting full. The transfer device accelerates the empty reel spool 16 so that it obtains a rotational speed corresponding to the web 2 speed, and when the preceding reel spool 13 is full, the transfer device brings the empty reel spool 16 into contact with the web 2 downstream the upper guide roll 7, wherein wrapping of the web 2 around the empty reel spool 16 occurs and the contact of the web 2 with the now finished paper reel 14 is interrupted. This stage of the winding sequence is shown in FIG. 2. Thereafter, the transfer device transfers the reel spool 16 to the carriage 11, which at this stage has delivered the preceding reel spool 13 with paper reel 14 and returned to the supporting body in order to take over the reel spool 16 from the transfer device. In an alternative embodiment, which is not shown, the reel-up can include two carriages, which alternately support the reel spools during the winding, wherein the transfer device can deliver the reel spool to one of the carriages directly after the wrapping, without having to wait for the carriage to return after having delivered the preceding reel spool. After having taken over the reel spool 16 from the transfer device, the actuator 12 will adjust the position of the carriage 11 during the rest of the winding sequence, so that the desired linear load is obtained in the reel nip. As the carriage 11 in the present case is movable only in one plane, the horizontal plane, the reel nip will be moved closer to the lower guide roll 8 during the winding sequence. This is illustrated in FIG. 2, where the initial position 17 and the end position 18 of the reel nip are evident.

Figure 3:
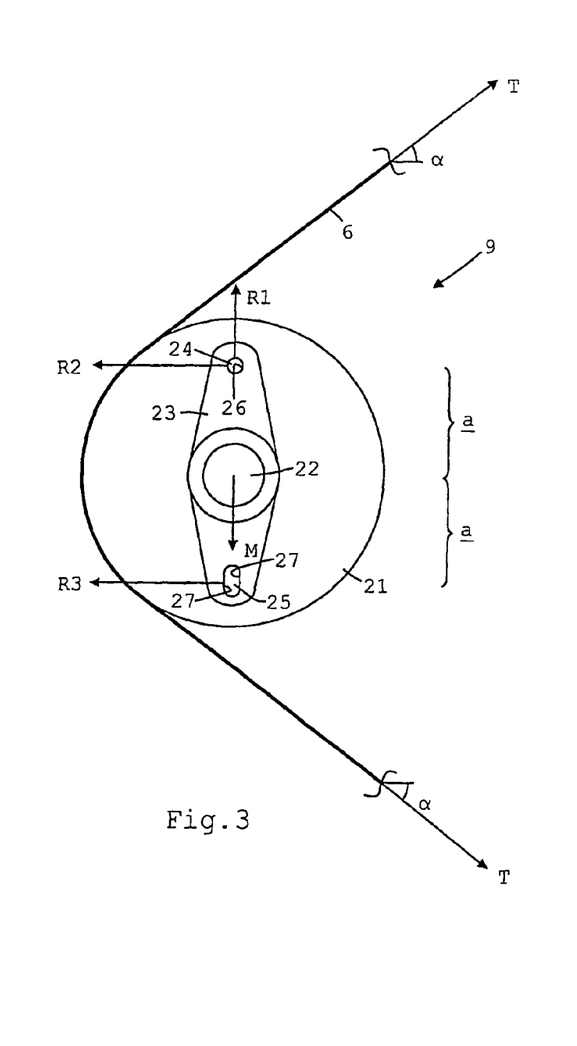
FIGS. 3 and 4 show a measuring unit of the reel-up according to FIGS. 1 and 2.

As has been described in the foregoing, the actuator 12 controls the linear load, and thereby the deflection of the belt 6 at the reel nip 15 (see FIG. 1). The actuator 12 accomplishes this by adjusting the position of the carriage 11 in relation to the wire 3 and the underlying belt 6. In order to measure the linear load, the reel-up 1 includes a measuring unit 19, including said inner guide roll 9 and a structure 20 supporting the guide roll 9. In the following, the measuring unit 19 will be described in greater detail with reference to FIG. 3, which shows the guide roll 9, and FIG. 4, which shows the supporting structure 20. The guide roll 9 includes a circular cylindrical roll body 21, around which the belt 6 travels. At its ends, the roll body 21 exhibits projecting shaft journals 22. The guide roll 9 also includes yokes 23, in which the shaft journals 22 are rotatably arranged. In FIG. 3, only one yoke 23 is visible. Accordingly, the roll body 21 is rotatably arranged about an axis of rotation, being defined by the shaft journals 22 and extending in the transverse direction of the belt 6.

In the main, each yoke 23 has the shape of a flat rectangle having a central, throughgoing shaft aperture with bearings for said shaft journal 22. In a mounted condition, each yoke 23 is arranged in a plane being perpendicular to the axis of rotation of the roll body 21 and has an almost vertical alignment, as is evident from FIG. 3. At its upper portion, and at a predetermined distance a from the centre of the shaft aperture, the yoke 23 exhibits a first, upper aperture 24, and at its lower portion, and at the same predetermined distance from the centre of the shaft aperture, the yoke 23 exhibits a second, lower aperture 25. The apertures 24 and 25, which can be throughgoing or counterbored, are in the present case arranged along a straight line passing through the centre of the shaft aperture, said line being arranged to coincide with the vertical line when the yoke 23 is in a mounted position. The upper aperture 24 is circular and exhibits a circular cylinder-shaped, inside rest surface 26. The lower aperture 25 is elongated in the direction of said straight line and exhibits two opposing, inside rest surfaces 27 being parallel to said line.

Figure 4:
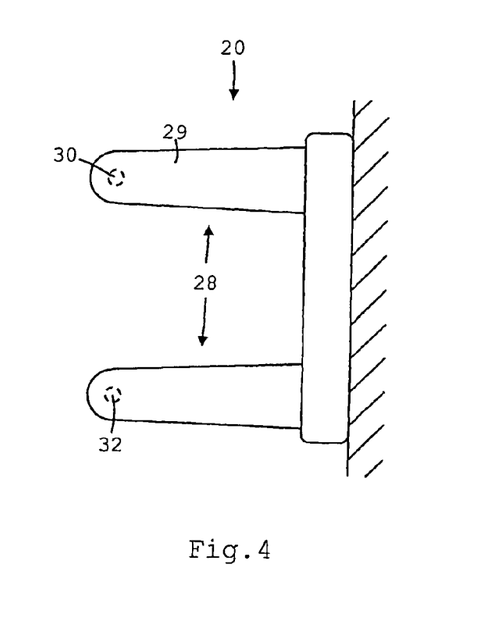

The supporting structure 20 is fixedly attached to the rest of the reel-up and includes two pairs of support arms 28, out of which only one is visible in FIG. 4. A first, upper support arm 29 of the pair of support arms 28 includes a circular cylindrical journal 30 projecting in the transverse direction of the belt 6. The journal 30 has a diameter which is substantially equal to the diameter of the upper aperture 24, and is arranged for torque-free interaction with the rest surface 26 of the upper aperture 24 when in a mounted condition. In this context, torque-free means that the journal 30 and the rest surface 26 are arranged to interact so that no turning torque is transferred between the rest surface 26 and the journal 30. In other words, the journal 30 is arranged for receiving only radial forces. A second, lower support arm 31 of the pair of support arms 28 includes a journal-like load cell 32, projecting in the transverse direction of the belt 6. The load cell 32 has a diameter which is equal to the distance between the rest surfaces 27 of the lower aperture 25, and is arranged for interacting with the rest surfaces 27 when in a mounted condition. As the rest surfaces 27 are parallel, the load cell 32 is arranged for receiving forces in only one plane, in the present case the horizontal plane, since the rest surfaces 27 are aligned vertically when in a mounted condition.

As has been mentioned in the foregoing, the tensile stress in the belt 6 is a function of the linear load in the reel nip. In FIG. 3, the tensile stress is indicated with T. The reaction forces by means of which the journal 30 and the load cell 32 on each side of the roll body 21 influence the yoke 23, said forces being indicated with R1-R3 in FIG. 3, originate from said tensile stress T, as well as from the self-weight of the supporting roll 9, being indicated with M in FIG. 3. In the shown embodiment, the belt 6 makes the same angle α with the horizontal plane both before and after the inner supporting roll 9, as is evident from FIG. 3, which is the reason why the force and torque equilibrium of the system can be written as:

$$\rightarrow 2T\cos\alpha - (R2+R3) = 0 \quad \text{(Eq. 1)}$$

$$\uparrow R1 - M = 0 \quad \text{(Eq. 2)}$$

$$\circlearrowleft 2\underline{a}\,R3 - \underline{a}\,2T\cos\alpha = 0 \quad \text{(Eq. 3)}$$

wherein Equation 1 and 3 give:

$$R2 = R3 = T\cos\alpha \quad \text{(Eq. 4)}$$

The same condition prevails on the other side (not shown) of the roll body 21.

Accordingly, as is evident from Equation 4, the load on the load cell 32, i.e. R3, is a function of the tensile stress T in the belt 6, said tensile stress T in its turn being a function of the linear load in the reel nip. Each load cell 32 is connected to a control unit 33 (see FIGS. 1 and 2), which is arranged for recording the load on the load cells 32. Accordingly, the roll body 21 constitutes a measuring body of the measuring unit 19, said measuring body being suspended from the reel-up free of torques, along the axis which is defined by the journals 30, and being influenced by a turning torque about the axis which is a function of the linear load, and the load cells 32 constitute a load receiving device which is arranged for interacting with the measuring body, in this case via the yokes 23, in order to receive and record the turning torque and to convey information about the linear load to the control unit 33 in the form of load signals.

It should be emphasized herein that, in spite of the fact that the roll body 21 is influenced by a turning torque about the axis being defined by the journals 30, the roll body does not perform any rotation around this axis, but all turning torque is received by the load cells 32.

By means of utilizing known signal transfer techniques, the control unit 33 is arranged for receiving the load signals from the load cells 32, and for transmitting control signals controlling carriage movement to the actuator 12 in response to these signals. This signal transfer can be done either by wire or wireless means. Preferably, the control unit 33 includes programmable logic for evaluating and processing the load signals. The control unit 33 can, for example, be arranged to compare actual values, being obtained from the load signals, to predetermined, programmed desired values at regular intervals during the winding sequence, to calculate the difference between the actual values and the desired values, and to transmit a correcting control signal to the actuator 12 in order to minimize said difference. The control unit 33 can also be arranged to evaluate the load signals from the load cells 32 on each side of the roll body 21 separately. In that way, linear load differences between the web 2 ends can be detected and corrected. The inner guide roll 9 can also include a plurality of partial rolls, being coaxial and placed in a succession in the transverse direction of the belt 6, each being arranged in the above-described fashion. In that way, a plurality of coaxial measuring bodies are created, by means of which the linear load along the entire width of the web 2, i.e. the linear load profile, can be measured. Preferably, in this case the belt 6 is divided into a plurality of partial belts; one partial belt for each partial roll. In other words, in this embodiment the reel-up comprises a plurality of measuring bodies being arranged in order to be influenced by individual turning torques which are functions of the linear load at different positions along the reel nip. This arrangement can advantageously be combined with the reel-up described in the above-mentioned document EP 0860391.

Preferably, the wrapping angle of the belt 6 around the roll body 21 is symmetrical about the horizontal plane, as shown in FIG. 3, whereby the tensile stress T influences the roll body 21 with a resulting force acting only in the horizontal plane. If each yoke 23 is oriented vertically with the journal 30, the shaft journal 22 and the load cell 32 in the vertical line, as is the case in FIG. 3, the advantage is obtained that the combined weight of the roll body 21 and the yokes 23 does not give any disturbing load contribution to the load cells 32, since this weight is received entirely by the journals 30. Preferably, also the rest surfaces 27 interacting with the load cells 32 are aligned substantially vertically, whereby the load cells 32 receive load only in a horizontal direction. In that way, the additional advantage is obtained that the resulting force is orthogonal to the rest surfaces 27, wherein the sensitivity of the measuring unit 19 is maximised, since a component of the resulting force deviating from the orthogonal direction does not give any load contribution to the load cells 32 but only puts a load on the journals 30. It is appreciated, however, that other geometries of the measuring unit are included within the principle of the invention. For instance, the wrapping angle of the belt 6 around the roll body 21 can be varied, as well as the positions of the apertures 24 and 25 in relation to the shaft journal 22.

Figure 5:
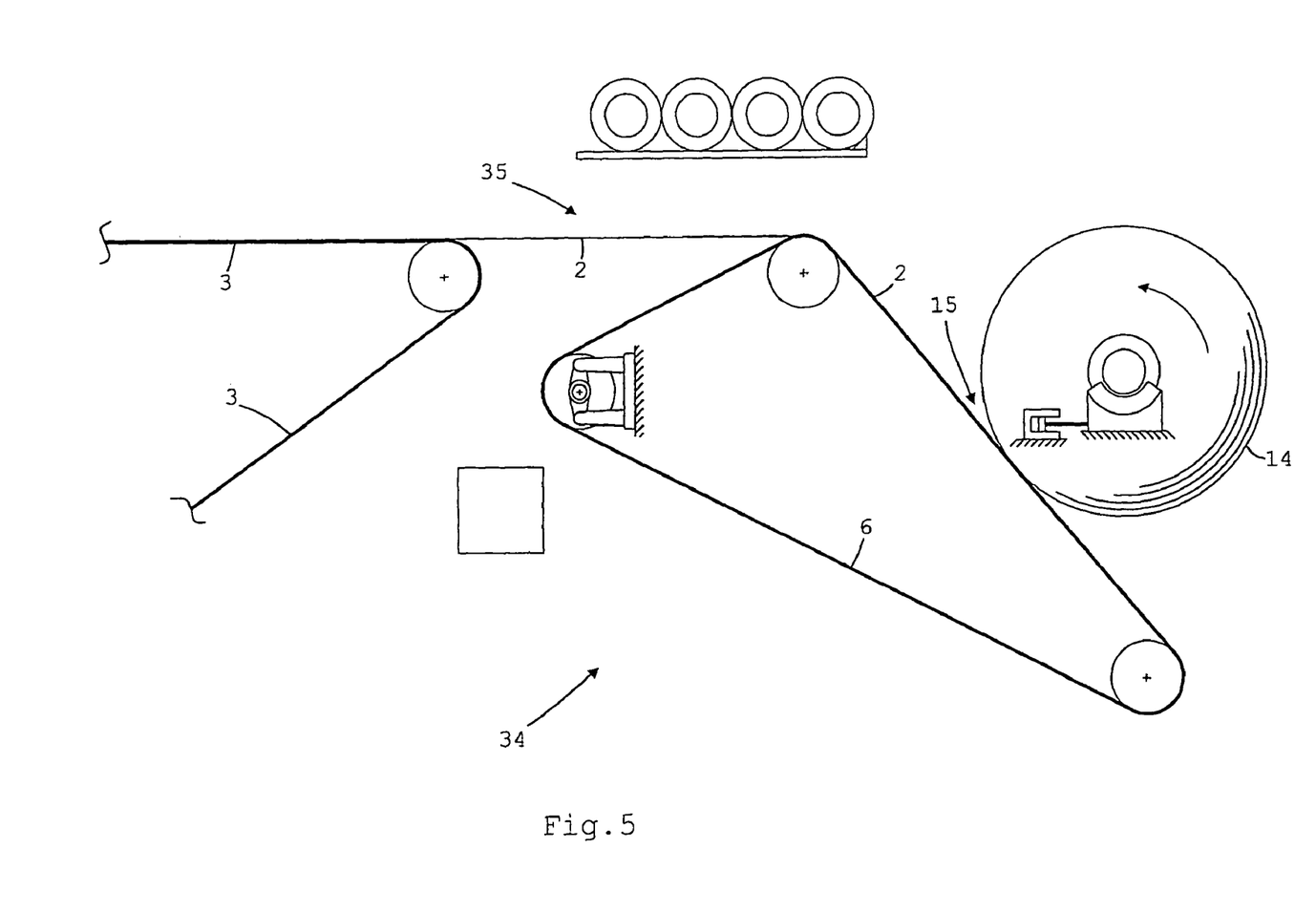
FIG. 5 is a schematic representation of a second embodiment of a reel-up according to the invention.

FIG. 5 shows a second embodiment of a reel-up 34 according to the invention, differing from the reel-up 1 according to FIGS. 1 and 2 only in that the web 2 is guided to the belt 6 via a free draw 35. In such a case, the wire 3 turns around before it reaches the belt 6, and the reel nip 15 is formed by means of the paper reel 14 abutting directly against the belt 6. It is appreciated that the above-described measurement of the linear load functions just as well in this reel-up.

Figure 6:
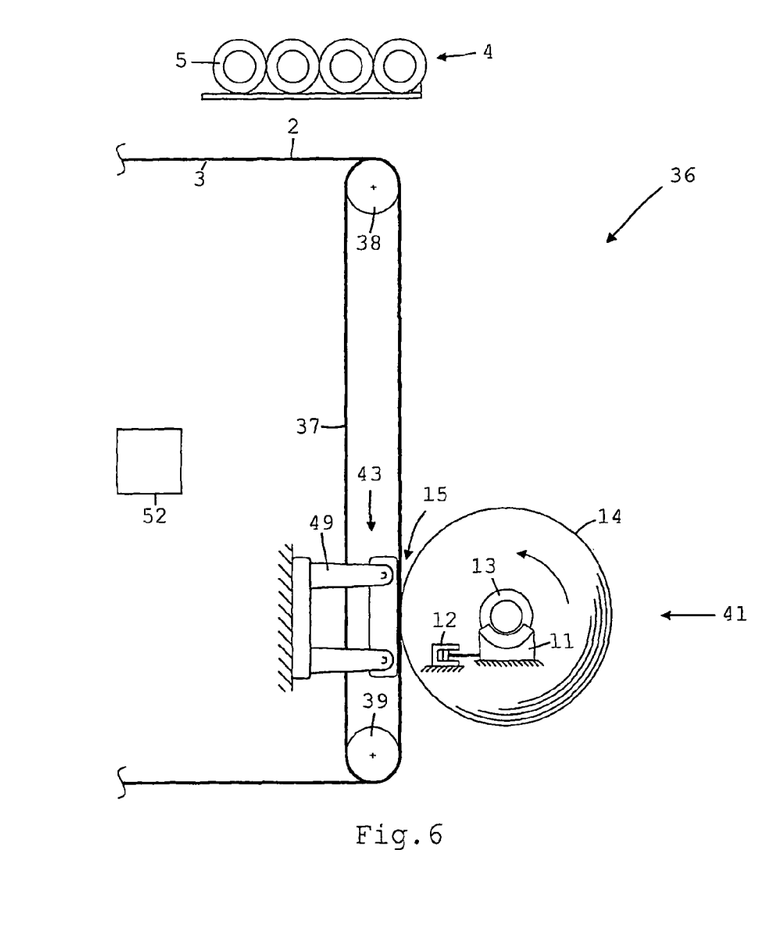
FIG. 6 is a schematic representation of a third embodiment of a reel-up according to the invention.

FIG. 6 shows another embodiment of a reel-up 36 according to the invention. Like the previously described reel-up 1, the reel-up 36 is arranged for receiving and winding a paper web 2 arriving from a drying section (not shown) of a paper machine while being supported by an endless wire 3, in a continuous succession of winding sequences. The reel-up 36 includes a storage 4 of reel spools 5, onto which said winding is intended to be done. Furthermore, the reel-up 36 includes a supporting body in the form of an endless belt 37, travelling inside the wire loop 3 around an upper guide roll 38 and a lower guide roll 39. The upper guide roll 38 is arranged directly above the lower guide roll 39, which is the reason why the belt 37 has a substantially vertical extension along the distance between the guide rolls 38, 39, i.e. makes an angle of 90° with the horizontal plane. Also the wire 3 travels over the guide rolls 38 and 39, and accordingly, the paths of the wire 3 and the belt 37 coincide between the guide rolls 38 and 39 in such a way that the wire 3 is arranged to travel together with and outside/on top of the belt 37.

The reel-up 36 also includes a winding unit 41. The winding unit 41 includes a support unit in the form of a carriage 11 being movable in the horizontal plane, and an actuator 12 for moving the carriage 11 in this plane. The carriage 11 is arranged for rotatably supporting a reel spool 13 during a winding sequence, so that a paper reel 14 can be formed onto the reel spool 13. The paper reel 14 is arranged for interacting with the belt 37 and the wire 3 between the guide rolls 38 and 39, during at least a part of the winding sequence, wherein a reel nip 15 is formed through which the web 2 travels. The linear load in the reel nip 15 is controlled by means of the paper reel 14 being brought into larger or smaller interaction with the supporting body by means of the actuator 12. The actuator 12 also has the task of ensuring that the desired linear load is maintained as the diameter of the paper reel 14 increases during the winding. This is accomplished by means of the actuator 12, more or less continuously, bringing the carriage 11 to leave the supporting body as the diameter of the paper reel 14 increases.

Before a winding sequence, an empty reel spool is accelerated so that it obtains a rotational speed corresponding to the web speed. Thereafter, the empty reel spool is brought into contact with the web, wherein wrapping of the web around the empty reel spool occurs.

In order to measure the linear load, the reel-up 36 includes a measuring unit 43, being arranged inside the belt 37 loop right in front of the winding unit 41, for measuring the linear load when the winding unit 41 is used. In the following, the measuring unit 43 will be described in greater detail with reference to FIG. 7.

Figure 7:
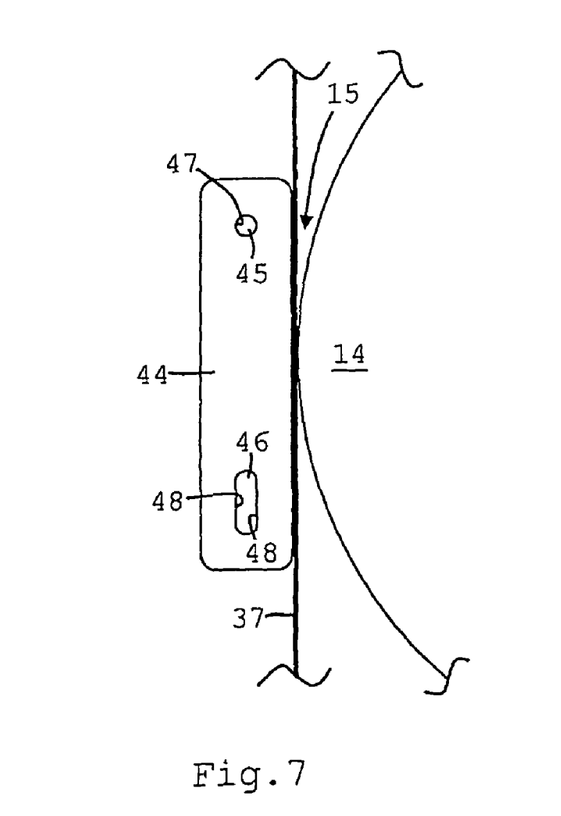
FIGS. 7 and 8 show a measuring unit of the reel-up according to FIG. 6.

The measuring unit 43 includes a generally rectangular block-shaped sliding body 44, extending transversely to the belt 37 and having one of its broadsides facing, and in sliding contact with, the belt 37, behind the position where the paper reel and the supporting body forms the reel nip 15. In other words, the broadside of the sliding body 44 facing the belt 37 is arranged substantially in parallel with the belt 37. At its upper portion, i.e. upstream the position of the reel nip 15, each end surface of the sliding body 44 exhibits a first, upper aperture 45, and at its lower portion, i.e. downstream the position of the reel nip 15, a second, lower aperture 46. The apertures 45 and 46 can be throughgoing or counterbored. The upper aperture 45 is circular and exhibits a circular cylinder-shaped, inside rest surface 47. The lower aperture 46 is elongated in the direction of the sliding body 44 and exhibits two opposing and parallel, inside rest surfaces 48.

Figure 8:
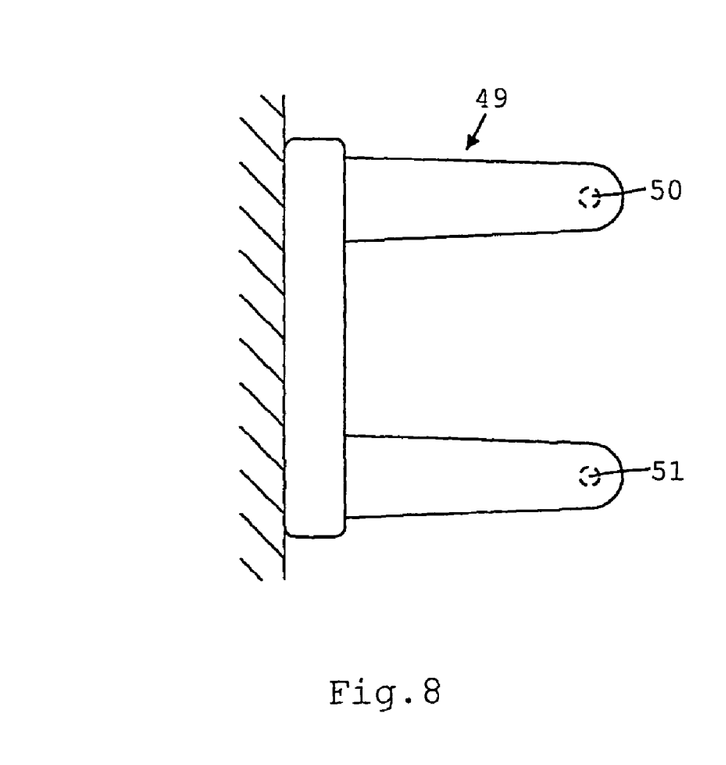

The measuring unit 43 also includes a supporting structure 49 (see FIG. 8) which is substantially similar to the supporting structure 20 described in connection with FIG. 4, i.e. it is fixedly attached to the rest of the reel-up and includes a projecting journal 50 for torque-free interaction with the rest surface 47 of the upper aperture 45, as well as a journal-like load cell 51 for interaction with the rest surfaces 48 of the lower aperture 46. In this context, torque-free interaction means that no turning torque is transferred between the rest surface 47 and the journal 50. In other words, the journal 50 is arranged for receiving only radial forces. The load cell 51 has a diameter which is equal to the distance between the rest surfaces 48 of the lower aperture 46. As the rest surfaces 48 are parallel in a mounted condition vertically aligned, the load cell 51 is arranged for receiving forces only in the horizontal plane. At the other end of the sliding body 44, which is not visible in FIG. 7, the sliding body 44 is suspended in the same way, and each load cell 51 is connected to a control unit 52 (see FIG. 6), which is arranged for recording the load on the load cells 51.

During a winding sequence, when the paper reel 14 abuts against the wire 3, and accordingly influences the wire 3 and the underlying belt 37 with a linear load, the paper reel 14 influences the sliding body 44 with a force which is a function of the linear load, said force being received and recorded by the load cells 51. Accordingly, the sliding body 44 constitutes a measuring body of the measuring unit 43, said measuring body being influenced by said force, and the load cells 51 constitute load receiving means, which are arranged for interacting with the measuring body in order to receive the force and to convey information about the linear load, in the form of load signals, to the control unit 52. The control unit 52, in its turn, is connected to the actuator 12 of the winding unit 41 and arranged for receiving and processing load signals from the load cells 51 and for transmitting control signals to the actuator 12 in response to these signals in the same way as the previously described control unit 33. Accordingly, the control unit 52 preferably includes programmable logic for evaluating and processing the load signals, for example by means of comparing actual and desired values to each other, as has described in the foregoing. The control unit 52 can also be arranged for evaluating the load signals from the load cells 51 on each side of the sliding body 44 separately. In that way, linear load differences between the web 2 ends can be detected and corrected. According to an alternative embodiment (not shown), the sliding body includes a plurality of partial sliding bodies being placed in a succession in the transverse direction of the belt 37, each being arranged in the above-described way. In that way, the linear load along the width of the web 2 can be measured and linear load differences can be detected and corrected.

In order to ensure that the self-weight of the sliding body 44 does not give any disturbing load contribution to the load cells 51, the journals 50 preferably are arranged in the same vertical plane as the centre of gravity of the sliding body 44.

In the foregoing, the invention has been described starting from a few embodiments. It is appreciated, however, that other embodiments are possible within the scope of the invention.

For example, the invention can be used in such reel-ups that are described in the above-mentioned documents WO 2004/110909, WO 2005/077796 and EP 0658504. It should be pointed out, however, that the invention can be applied when rewinding in a rewinding station as well as when reeling in a fiber web producing machine. It is also appreciated that the invention can be used for other paper and board qualities than tissue paper.

The invention claimed is:

1. A reel-up for reeling a fiber web, the reel-up comprising:
a supporting body movable with respect to and forming a reel nip with a growing fiber web roll receiving the fiber web, the fiber web roll defining an axis; and
at least one measuring body operably engaged with the supporting body and defining a cross-machine axis extending in parallel with the fiber web roll axis, the at least one measuring body being arranged in order to be influenced by a turning torque imparted thereto by movement of the supporting body, the at least one measuring body being configured so as to measure a horizontal component of a force directed perpendicularly to the cross-machine axis of the at least one measuring body and associated with the turning torque, the horizontal component of the force directed perpendicularly to the cross-machine axis being further associated with a linear load applied by the supporting body to the growing fiber web roll in the reel nip.

2. The reel-up according to claim 1, wherein the reel-up is arranged for winding the fiber web, comprising a paper web, onto reel spools in a continuous succession of winding sequences, the paper web arriving from a drying section of a paper making machine while being supported by a wire, and wherein the reel-up comprises:
  a support unit arranged for rotatably supporting a respective one of the reel spools during one of the winding sequences such that a paper web roll is formed onto the respective reel spool, the paper web roll being arranged to interact with the supporting body during at least a part of each winding sequence in order to form the reel nip with the paper web roll;
  an actuator for moving the support unit;
  a measuring unit configured to record load signals associated with and being a function of the linear load in the reel nip; and
  a control unit configured to receive the load signals and emit control signals to the actuator,
  wherein the measuring unit comprises:
  the at least one measuring body suspended so as to be free of torques about an axis of suspension associated with the at least one measuring body, and arranged to be influenced by the turning torque, as imparted thereto by movement of the supporting body, about the axis of suspension, the at least one measuring body being configured so as to measure a horizontal component of a force directed perpendicularly to the cross-machine axis of the at least one measuring body and associated with the turning torque, the horizontal component of the force directed perpendicularly to the cross-machine axis being further associated with the linear load applied by the supporting body to the paper web roll in the reel nip; and
  a load receiving device arranged to interact with the at least one measuring body in order to receive and record the horizontal component of the force directed perpendicularly to the cross-machine axis of the at least one measuring body and associated with the turning torque and to convey the horizontal component of the force directed perpendicularly to the cross-machine axis of the at least one measuring body and associated with the turning torque, in the form of the load signals, to the control unit.

3. The reel-up according to claim 2, wherein the load receiving device is arranged along a line parallel to the axis of suspension.

4. The reel-up according to claim 3, wherein the line is arranged in the same vertical plane as the axis of suspension.

5. The reel-up according to claim 2, wherein the supporting body comprises an endless belt and the measuring unit is arranged inside a loop formed by the belt.

6. The reel-up according to claim 5, wherein the belt is arranged for travelling around at least three guide rolls, wherein an interaction between the paper web roll and the supporting body is arranged to occur along the extension of the belt between two of the guide rolls, and wherein the third guide roll includes the measuring body.

7. The reel-up according to claim 6, wherein the third guide roll comprises:
  a cylindrical roll body rotatably arranged about an axis of rotation, the belt arranged to travel around the roll body;
  yokes suspended from the reel-up at each end of the roll body free of torques about the axis of suspension in order to rotatably support the roll body about the axis of rotation, wherein the axis of rotation is displaced in parallel to the axis of suspension; and
  load cells arranged for interacting with the roll body via the yokes,
  wherein the roll body constitutes the measuring body, and the load cells constitute the load receiving device.

8. The reel-up according to claim 7, wherein a wrapping angle of the belt around the roll body is symmetrical about a horizontal plane.

9. The reel-up according to claim 7, wherein the control unit is arranged for evaluating load signals from the load cells on each side of the measuring body separately.

10. The reel-up according to claim 5, wherein the belt is arranged inside a loop formed by the wire, and the wire is arranged for supporting the web through the reel nip.

11. The reel-up according to claim 5, wherein the belt is arranged outside a loop formed by the wire and the belt is arranged for supporting the web through the reel nip.

12. The reel-up according to claim 2, wherein the belt is arranged for travelling around at least two guide rolls, and the interaction between the paper web roll and the supporting body is arranged to occur along an extension of the belt between the at least two guide rolls; wherein the measuring body includes a sliding body suspended so as to be free of torques about the axis of suspension, one side of the sliding body facing and in sliding contact with the belt opposite to the interaction between the paper web roll and the supporting body; and wherein the load receiving device comprises a load cell arranged to interact with the sliding body.

13. The reel-up according to claim 2, wherein a center of gravity of the measuring body is arranged vertically below the axis of suspension.

14. The reel-up according to claim 1, wherein the reel-up comprises a plurality of measuring bodies arranged in order to be influenced by individual turning torques imparted thereto by movement of the supporting body, the plurality of measuring bodies each being configured so as to measure the horizontal component of the force directed perpendicularly to the cross-machine axis of the at least one measuring body and associated with the turning torque, with the horizontal component of the force directed perpendicularly to the cross-machine axis being further associated with the linear load at different positions in a cross-machine direction along the reel nip.

15. A method for reeling a fiber web in a reel-up, the method comprising:
  forming a reel nip between a growing fiber web roll receiving the fiber web and a supporting body, the fiber web roll defining an axis; and
  at least partially measuring a linear load in the reel nip with at least one measuring body operably engaged with the supporting body and defining a cross-machine axis extending in parallel with the fiber web roll axis, the at least one measuring body being arranged in order to be influenced by a turning torque imparted thereto by movement of the supporting body, the at least one measuring body being configured to measure the linear load, as a horizontal component of a force directed perpendicularly to the cross-machine axis of the at least one measuring body and associated with the turning torque, applied by the supporting body to the growing fiber web roll in the reel nip.

16. A measuring unit arranged for detecting load signals associated with a linear load in a reel nip of a reel-up, formed between a growing fiber web roll being reeled, the fiber web roll defining an axis, and a movable supporting body, the measuring unit comprising:

a measuring body operably engaged with the supporting body and defining a cross-machine axis extending in parallel with the fiber web roll axis, the at least one measuring body being arranged in order to be influenced by a turning torque imparted thereto by movement of the supporting body, the measuring body being configured to measure the linear load, as a horizontal component of a force directed perpendicularly to the cross-machine axis of the at least one measuring body and associated with the turning torque, applied by the supporting body to the growing fiber web roll in the reel nip.

17. The measuring unit according to claim 16, wherein the measuring unit is arranged to transmit the load signals to a control unit, wherein the measuring body is suspended so as to be free of torques about an axis of suspension associated with the measuring body, and arranged to be influenced by the turning torque, as imparted thereto by movement of the supporting body, about the axis of suspension, and wherein the measuring unit comprises a load receiving device arranged to interact with the measuring body in order to receive and record the horizontal component of the force directed perpendicularly to the cross-machine axis of the at least one measuring body and associated with the turning torque and to convey the horizontal component of the force directed perpendicularly to the cross-machine axis of the at least one measuring body and associated with the turning torque to the control unit in the form of the load signals.

* * * * *